United States Patent
Tsengas

(10) Patent No.: US 10,721,915 B1
(45) Date of Patent: Jul. 28, 2020

(54) PET TOYS

(71) Applicant: Steven Tsengas, Fairport Harbor, OH (US)

(72) Inventor: Steven Tsengas, Fairport Harbor, OH (US)

(73) Assignee: COSMIC PET LLC, Wichita, KS (US)

( * ) Notice: Subject to any disclaimer, the term of this patent is extended or adjusted under 35 U.S.C. 154(b) by 113 days.

(21) Appl. No.: 14/757,325

(22) Filed: Dec. 18, 2015

(51) Int. Cl.
*A01K 15/02* (2006.01)

(52) U.S. Cl.
CPC .................. *A01K 15/025* (2013.01)

(58) Field of Classification Search
CPC ............................. A01K 15/02; A01K 15/025
USPC .......................... 119/702, 707, 709; 446/409
See application file for complete search history.

(56) References Cited

U.S. PATENT DOCUMENTS

| | | | | |
|---|---|---|---|---|
| 2,949,697 | A * | 8/1960 | Licitis | A63H 33/005 200/52 R |
| 3,453,773 | A * | 7/1969 | Compton | A63H 33/005 446/458 |
| 4,310,987 | A * | 1/1982 | Chieffo | A63H 29/22 446/175 |
| 5,533,920 | A * | 7/1996 | Arad | A63H 33/005 446/409 |
| 5,924,909 | A * | 7/1999 | Yamakawa | A63H 33/005 446/442 |
| 7,166,047 | B2 * | 1/2007 | May | A63B 43/00 473/569 |
| 2004/0237905 | A1 * | 12/2004 | Tsengas | A01K 15/025 119/711 |
| 2010/0294211 | A1 * | 11/2010 | Tsengas | A01K 15/025 119/707 |
| 2011/0214616 | A1 * | 9/2011 | Levin | A01K 15/00 119/707 |
| 2012/0244969 | A1 * | 9/2012 | Binder | A63H 33/18 473/570 |
| 2013/0055965 | A1 * | 3/2013 | Valle | A01K 15/025 119/710 |
| 2015/0020748 | A1 * | 1/2015 | Wechsler | A01K 15/025 119/711 |
| 2015/0237828 | A1 * | 8/2015 | Peavey | A01K 15/025 119/707 |

(Continued)

*Primary Examiner* — Christopher D Hutchens
(74) *Attorney, Agent, or Firm* — Gugliotta & Gugliotta, LPA

(57) ABSTRACT

A rollable pet toy is provided forming a skeletal ball that contains a simulated mouse, bird, or other small prey type animal. The skeletal ball provides a rollable form factor while still providing significant access area through which the pet may paw at or access the internal volume. The simulated mouse, bird or other small prey type animal, contained within, is visible and partially accessible. The simulated mouse, bird or other small prey animal is pivotally attached about an axle that is secured on each end, and is further motorized about the axle in a manner that the simulated animal can be made to move such as bobbing up and down. Additional movements, such as head bobbing for and back, or side to side, may further be incorporated. Sound emanation from a prerecorded sound chip may be further provided. Added olfactory stimulus, such as catnip or other herbaceous materials, may be further molded into the skeletal ball structure or contained within the simulated animal.

10 Claims, 4 Drawing Sheets

(56) References Cited

U.S. PATENT DOCUMENTS

| | | | |
|---|---|---|---|
| 2015/0245593 A1* | 9/2015 | O'Mara | A01K 15/025 446/457 |
| 2015/0342145 A1* | 12/2015 | Christianson | A01K 15/021 119/51.11 |
| 2016/0316719 A1* | 11/2016 | Parness | A01K 15/025 |

* cited by examiner

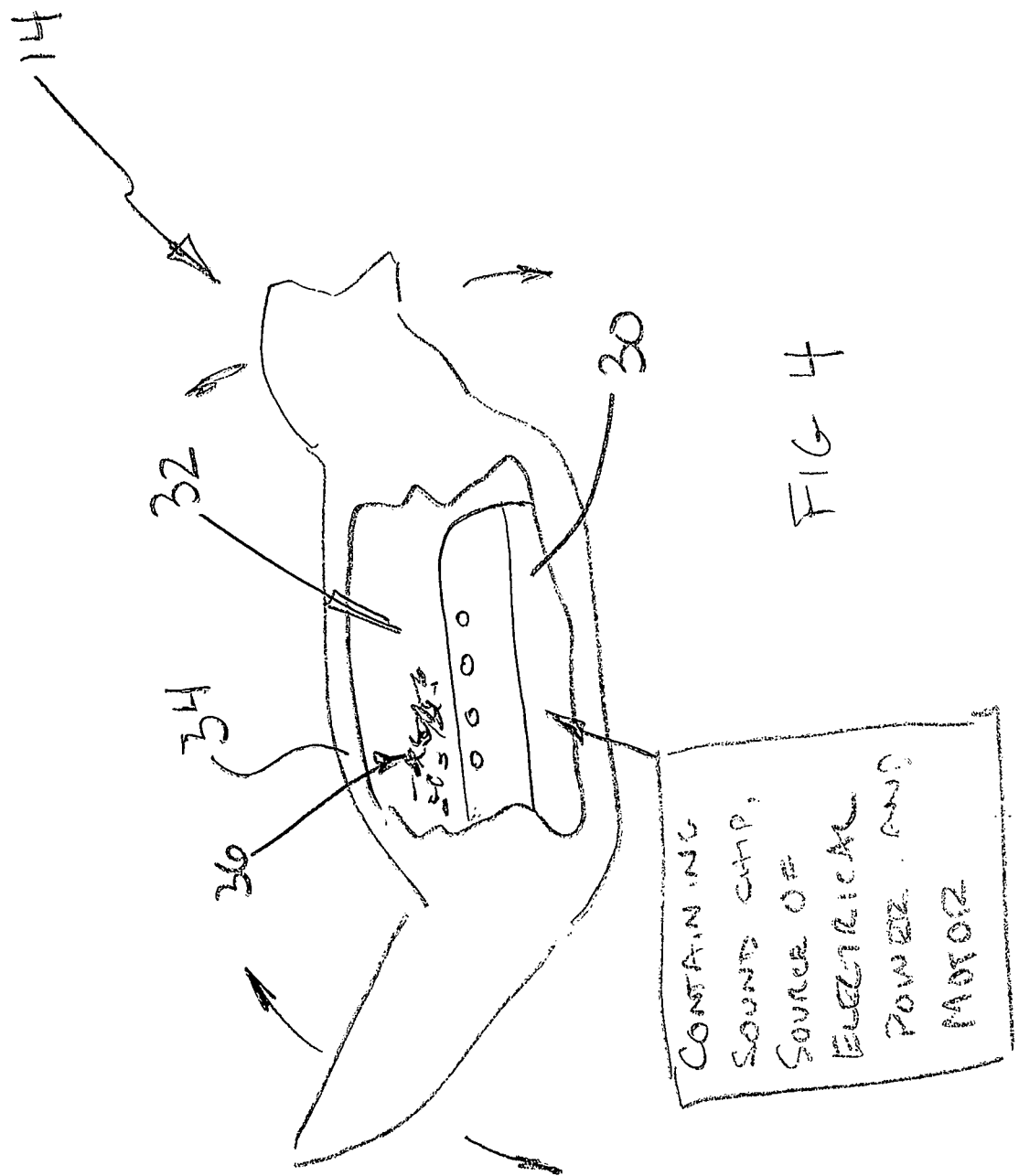

PET TOYS

RELATED APPLICATIONS

The present invention claims the benefit of U.S. Provisional Application 62/082,919 filed on Nov. 21, 2014, and incorporated by reference as if fully rewritten herein.

BACKGROUND OF THE INVENTION

1. Field of the Invention

The present invention relates generally to a pet toy having stimuli to encourage pet interaction and, more particularly, to such a device having scent, motion and sound sensory stimulation by actuating rotational motion and sound while utilizing an herbal attractant.

2. Description of the Related Art

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment.

Consequently, there is a continuous need for providing different apparatuses and methods of attracting the interest of pets.

SUMMARY OF THE INVENTION

It is an object of the present invention to provide an improved sensory simulating toy for pets.

It is a feature of the present invention to provide such a pet toy that includes a ball having both a prerecorded sound chip and a motion mechanism that are each actuated by contact with the toy.

Briefly described according to a preferred embodiment of the present invention, a rollable pet toy is provided forming a skeletal ball that contains a simulated mouse, bird, or other small prey type animal. The skeletal ball provides a rollable form factor while still providing significant access area through which the pet may paw at or access the internal volume. The simulated mouse, bird or other small prey type animal, contained within, is visible and partially accessible. The simulated mouse, bird or other small prey animal is pivotally attached about an axle that is secured on each end, and is further motorized about the axle in a manner that the simulated animal can be made to move such as bobbing up and down. Additional movements, such as head bobbing for and back, or side to side, may further be incorporated. Sound emanation from a prerecorded sound chip may be further provided. While sound types coordinating with the type of animal may be provided, an enhanced stimulus may be further provided by utilizing realistic and/or proprietary sounds of a narrow and particular frequency range that result in an instinctual response from domestic house cats or certain breeds of canines. Such enhanced, instinct responsive sounds are further described in greater detail in U.S. Pat. Nos. 6,550,426 and 6,371,053, both filed in the name of the same present inventor and incorporated by reference herein as if fully rewritten. Added olfactory stimulus, such as catnip or other herbaceous materials, may be further molded into the skeletal ball structure or contained within the simulated animal.

The use of movement, sound and smell all combined stimulate an animal to interact with the toy. A momentum actuated electronics can be used to either initiate a shutdown timer to power down the motorized electronics after a predetermined delay of inactivity, or to initiate the motion or sound functions once engaged by the pet.

These and other objects and features of the present invention are attained by various embodiments incorporating the teachings of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a cross sectional view of the stimulated animal 14 for use therewith.

DESCRIPTION OF THE PREFERRED EMBODIMENTS

Figure 1:
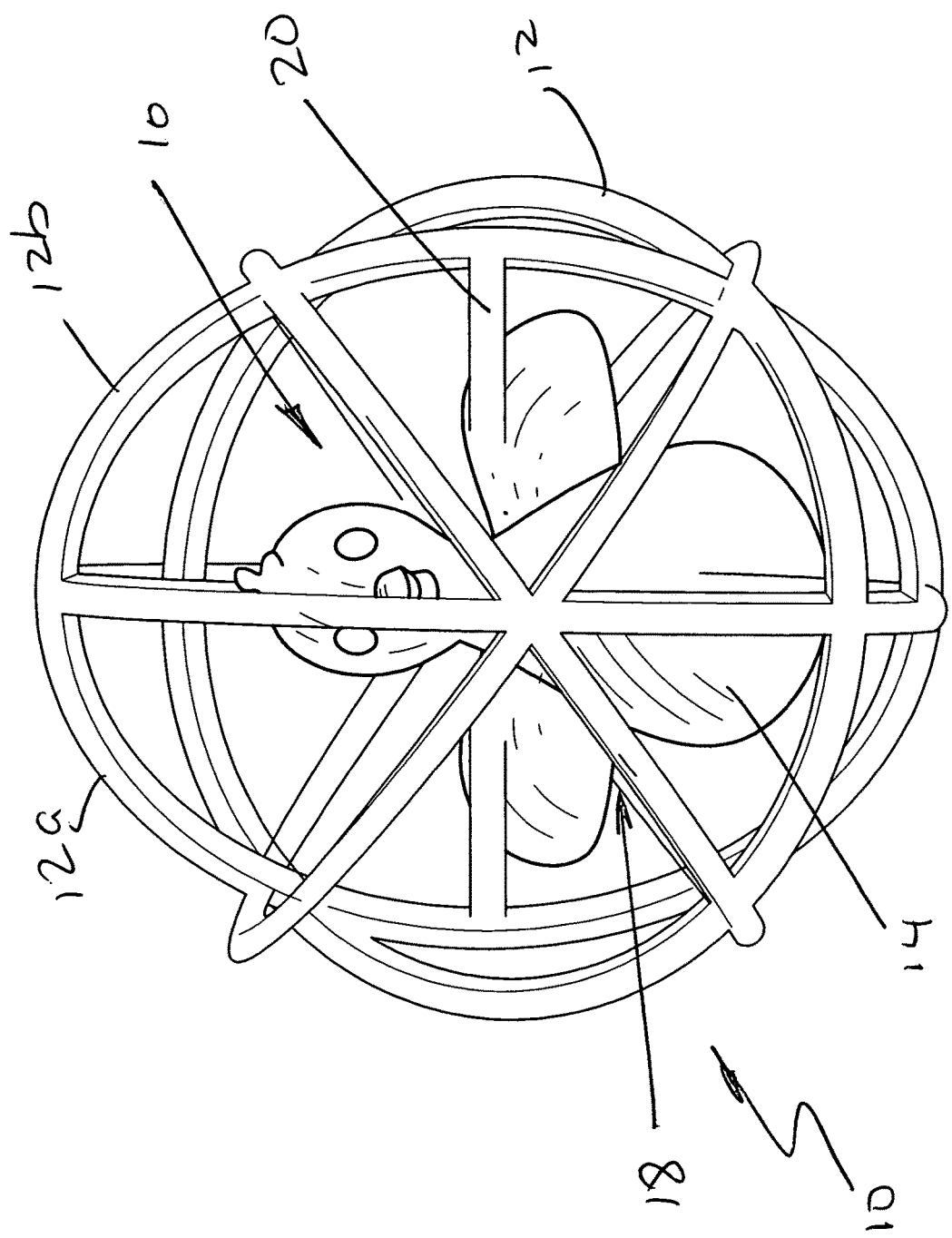
FIG. 1 is a front elevational view of a pet toy in accordance with the preferred embodiment of the present invention.
Figure 2:
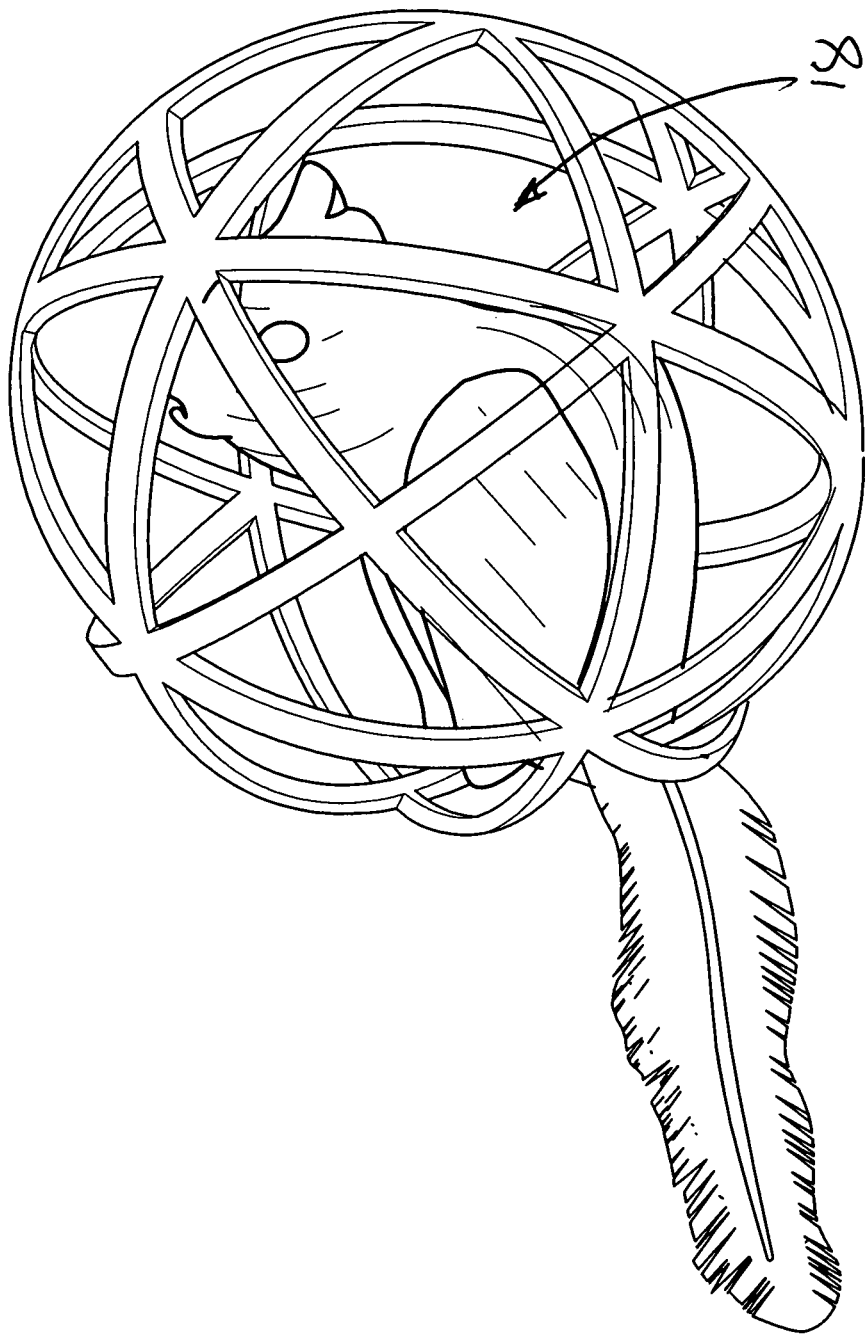
FIG. 2 is a side view thereof.
Figure 3:
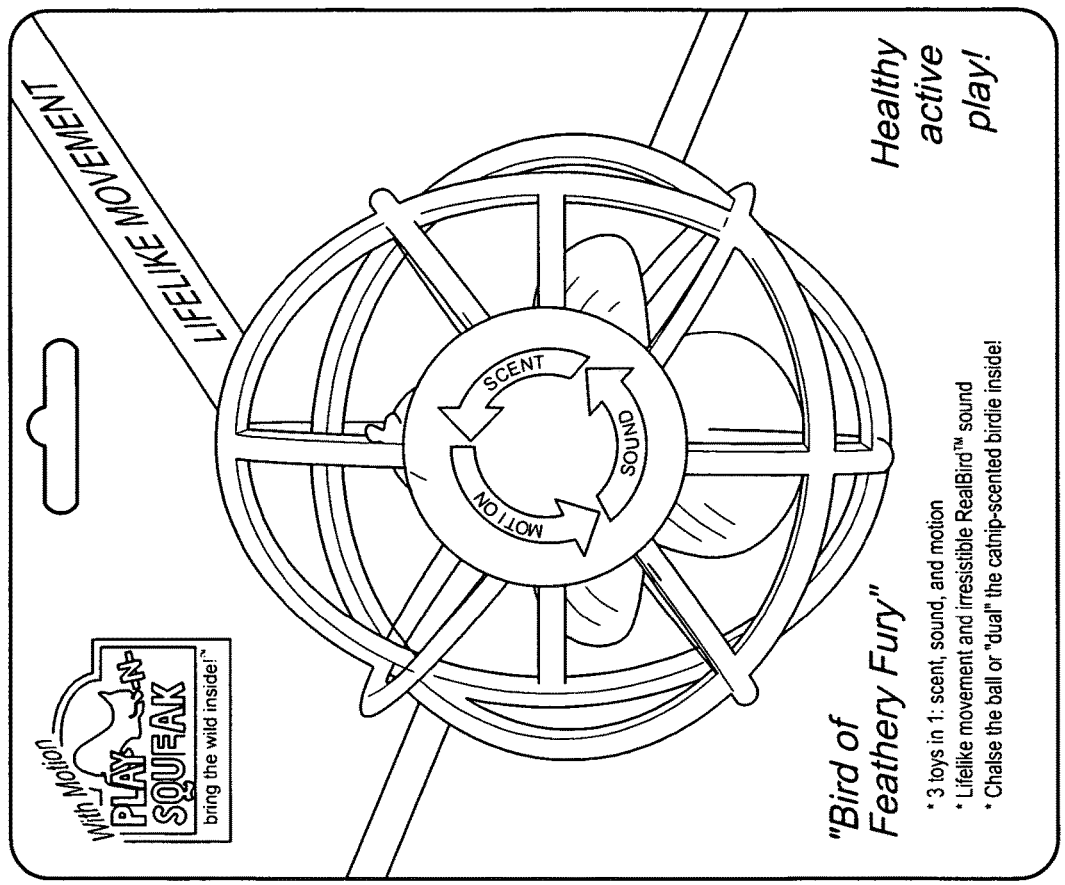
FIG. 3 is a front view of a pet toy in accordance with the preferred embodiment of the present invention shown enclosed in a viewable point of purchase package.

The best mode for carrying out the invention is presented in terms of its preferred embodiment, herein depicted within the FIGS. 1-4.

1. Detailed Description of the Figures

A rolling pet toy, generally noted as 10, is depicted within the Figures. The rollable pet toy 10 is provided forming a skeletal ball 12 that contains a simulated mouse, bird, or other small prey type animal 14, as described in greater detail below. The skeletal ball 12 provides a rollable form factor while still providing significant access area, generally shown as 16, through which the pet may paw at or access the internal volume 18.

The simulated mouse, bird or other small prey type animal 14 is contained within the internal volume 18, and is visible and partially accessible.

The simulated mouse, bird or other small prey animal 14 is pivotally attached about an axle 20. The axle 20 is secured on each end 22 to a frame member 12b of the skeletal ball 12. The simulated animal 14 is further motorized about the axle 22 in a manner such that the simulated animal 14 can be made to move such as bobbing up and down. Additional movements, such as head bobbing for and back, or side to side, may further be incorporated.

Sound emanation from a prerecorded sound chip may be further provided within the simulated animal 14. While sound types coordinating with the type of animal may be provided, an enhanced stimulus may be further provided by utilizing realistic and/or proprietary sounds of a narrow and particular frequency range that result in an instinctual response from domestic house cats or certain breeds of canines. As best described in conjunction with FIG. 4, the simulated animal 14 houses an electronic prerecorded sound device 30 within an internal cavity 32. The simulated animal 14 includes an outer cover 34, shown herein simulating a bird and having an interior cavity 22 for holding the sound device 30. Outer cover 20 is preferably fabricated from a relatively soft, yet durable, textile material with filling or stuffing and has the outward appearance of a bird. Sound device 30 includes a shaker barrel activator, a prerecorded sound chip and a source of electrical power, such as a battery. If desired, catnip 36 or other pet attractive scent material can be placed in the interior cavity 32 of outer cover 34 and the catnip 36, along with the outward appearance of outer cover 34, will attract pets, such as, for example, cats. Other shapes, in addition to a bird, can be used for the simulated animal 14. Preferably, these shapes simulate natural prey animals for the pet, such as mice, rodents, birds, etc. Other shapes, including arbitrary shapes, such as a ball, bone, football, fish, monkey, etc. can be used. The sound device 30 preferably emits a prerecorded sound in response to movement of sound device 30. Thus, when a pet, such as a cat, swats the pet toy 10, a prerecorded sound is activated. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continues for a predetermined time period, for example five (5) seconds, and then stops or may continue as long as the sound device is sensing motion of pet toy 10. Preferably, when the outer cover 34 simulates the shape of a natural prey of the pet, the pre-recorded sound is a simulated sound made by the natural prey, i.e., squeak for a mouse or chirp for a bird.

Added olfactory stimulus, such as catnip or other herbaceous materials, may be further molded into the skeletal ball structure or contained within the simulated animal.

The simulated animal 14 generally includes an outer cover having an internal cavity and sound chip assembly is positioned in the interior cavity of outer cover. The outer cover is most preferably fabricated from a relatively soft, yet durable, textile material with filling or stuffing and has the outward appearance of a mouse, bird, chipmunk, or other rodent or prey type animal. A sound chip assembly includes a shaker barrel activator, a prerecorded sound chip and a source of electrical power, such as a battery. If desired, catnip can be placed in the interior cavity of outer cover and the catnip, along with the outward appearance of outer cover, will attract pets, such as, for example, cats.

The sound chip housed within the simulated animal assembly 14 preferably emits a prerecorded sound in response to movement of the toy 10. A motor mechanism is operatively connected in conjunction the prerecorded sound chip to simultaneously sound and motion activity.

2. Operation of the Preferred Embodiment

In operation, when a user imparts motion or continued to move the simulated prey toy having a multi-sensory stimulation device targeted toward a pet's instincts and behaviors in accordance with a preferred embodiment of the present invention, sufficient physical motion activates the prerecorded sound chip and motor mechanism. A lifelike prey animal can move within the skeletal ball and can generate action and auditory responses when rolled or chased. A dog or cat can chase the ball or hunt the animal inside, with the ball structure designed to stay round for optimum rolling play. The toy can automatically shut off after a predetermined period of inactivity.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Patent Application.

Having thus described the invention what is claimed as new and desired to be secured by Letters Patent is as follows:

1. A toy comprising: a toy body housing;
   a prerecorded sound chip assembly contained within an inner cavity formed by said toy body housing, said sound chip assembly having a sound chip and a source of electrical power, said sound chip assembly adapted to emit a recorded or prerecorded sound in response to physical urging of said toy body housing;
   a skeletal outer ball circumscribing an outer cavity;
   an axle spanning through said outer cavity and mounted at opposing ends to said skeletal outer ball, wherein said toy body housing is rotatably mounted about said axle;
   and a motor mechanism operatively connected between said toy body housing and said axle and providing a rotating urging motion to said toy housing about said axle.

2. The toy of claim 1, wherein said toy body housing resembles a prey animal of a cat or dog.

3. The toy of claim 2, wherein said sound chip emits a sound resembling that of said prey animal.

4. The toy of claim 1, wherein said skeletal outer ball has an open frame for allowing a target pet to visually perceive the toy body housing inside.

5. The toy of claim 4, wherein said skeletal type ball comprises an open frame formed of geometrically intersecting ribs molded of a plastic.

6. The toy of claim 5, wherein said toy body housing is rotatably mounted about said axle at or near a center of mass such that momentum imparted onto said toy body through rolling of said skeletal outer ball urges a rotating motion onto said toy body about said axle.

7. A pet toy comprising:
   a toy body housing having an outer covering resembling a prey animal of a cat or dog;
   a prerecorded sound chip assembly contained within an inner cavity formed by said toy body housing, said sound chip assembly having a sound chip that emits a sound resembling that of said prey animal and a source of electrical power, said sound chip assembly adapted to emit a recorded or prerecorded sound in response to physical urging of said toy body housing;
   a skeletal outer ball circumscribing an outer cavity, said skeletal outer ball having an open frame formed of geometrically intersecting ribs molded of a plastic between and forming geometrically open windows for allowing a target pet to visually perceive the toy body housing inside;

an axle spanning through said outer cavity and mounted at opposing ends to said skeletal outer ball, wherein said toy body housing is rotatably mounted about said axle; and a motor mechanism operatively connected between said toy body housing and said axle such as to provide a rotating urging motion to said toy housing about said axle.

8. The pet toy of claim 7, wherein said toy body housing is rotatably mounted about said axle at or near a center of mass such that momentum imparted onto said toy body through rolling of said skeletal outer ball urges a rotating motion onto said toy body about said axle.

9. A pet toy comprising:

a toy body housing having an outer covering resembling a prey animal of a cat or dog;

a prerecorded sound chip assembly contained within an inner cavity formed by said toy body housing, said sound chip assembly having a sound chip that emits a sound resembling that of said prey animal and a source of electrical power, said sound chip assembly adapted to emit a recorded or prerecorded sound in response to physical urging of said toy body housing;

a skeletal outer ball circumscribing an outer cavity, said skeletal outer ball having an open frame formed of geometrically intersecting ribs molded of a plastic between and forming geometrically open windows for allowing a target pet to visually perceive the toy body housing inside;

an axle spanning through said outer cavity and mounted at opposing ends to said skeletal outer ball, wherein said toy body housing is rotatably mounted about said axle;

a first surface area of said geometrically open windows exceeds a second surface area of said geometrically intersecting ribs; and a motor mechanism operatively connected between said toy body housing and said axle such as to provide a rotating urging motion to said toy housing about said axle.

10. The pet toy of claim 9, wherein said toy body housing is rotatably mounted about said axle at or near a center of mass such that momentum imparted onto said toy body through rolling of said skeletal outer ball urges a rotating motion onto said toy body about said axle.

* * * * *